(12) United States Patent
Veron (10) Patent No.: US 6,390,552 B1
(45) Date of Patent: May 21, 2002

(54) PORTABLE SEAT APPARATUS

(76) Inventor: Vicky D. Veron, 31833 Netterville Rd., Denham Springs, LA (US) 70726

(*) Notice: Subject to any disclaimer, the term of this patent is extended or adjusted under 35 U.S.C. 154(b) by 0 days.

(21) Appl. No.: 09/727,415

(22) Filed: Dec. 1, 2000

(51) Int. Cl.[7] .............................. A47D 1/10; A47C 1/08
(52) U.S. Cl. ............... 297/256.17; 297/229; 297/440.2; 297/440.22; 280/33.993
(58) Field of Search ........................ 297/256.17, 256.16, 297/219.1, 440.2, 440.22, 229; 280/33.993, 33.992

(56) References Cited

U.S. PATENT DOCUMENTS

| | | | |
|---|---|---|---|
| 3,070,384 A | | 12/1962 | Buczak |
| 4,655,502 A | | 4/1987 | Houllis |
| 4,666,207 A | | 5/1987 | Quartano |
| 4,877,289 A | * | 10/1989 | Herrera ................ 297/256.17 |
| 5,106,155 A | | 4/1992 | Luehring |
| 5,330,250 A | * | 7/1994 | Reyes ............... 297/256.17 X |
| D367,197 S | | 2/1996 | Fuchs |
| D380,118 S | | 6/1997 | Ford |
| 6,186,521 B1 | * | 2/2001 | Divoky et al. ...... 297/256.17 X |
| 6,224,152 B1 | * | 5/2001 | Hughes et al. ......... 297/256.17 |

* cited by examiner

Primary Examiner—Anthony D. Barfield (57) ABSTRACT

A portable seat apparatus for making a child more comfortable when seated in a shopping cart, in particular. The portable seat apparatus includes a seat support assembly including a seat support member having a seat support portion and a back rest support portion and being adapted to fasten to a cart and a car seat; and also includes a cushioned seat member having a seat portion and a back rest portion and being attached to and supported upon said the support member; and further includes a fastening member for fastening the cushioned seat member to the seat support member.

11 Claims, 6 Drawing Sheets

PORTABLE SEAT APPARATUS

BACKGROUND OF THE INVENTION

1. Field of the Invention

The present invention relates to a seat apparatus for carts and the like and more particularly pertains to a new portable seat apparatus for making a child more comfortable when seated in a shopping cart, in particular.

2. Description of the Prior Art

The use of a seat apparatus for carts and the like is known in the prior art. More specifically, a seat apparatus for carts and the like heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,070,384; U.S. Pat. No. 4,666,207; U.S. Pat. No. 4,655,502; U.S. Pat. No. Des. 380,118; U.S. Pat. No. 5,106,155; and U.S. Pat. No. Des. 367,197.

While these devices fulfill their respective, particular objectives and requirements, the aforementioned patents do not disclose a new portable seat apparatus. The inventive device includes a seat support assembly including a seat support member having a seat support portion and a back rest support portion and being adapted to fasten to a cart and a car seat; and also includes a cushioned seat member having a scat portion and a back rest portion and being attached to and supported upon said the support member; and further includes a fastening member for fastening the cushioned seat member to the seat support member.

In these respects, the portable seat apparatus according to the present invention substantially departs from the conventional concepts and designs of the prior art, and in so doing provides an apparatus primarily developed for the purpose of making a child more comfortable when seated in a shopping cart, in particular.

SUMMARY OF THE INVENTION

In view of the foregoing disadvantages inherent in the known types of seat apparatus for carts and the like now present in the prior art, the present invention provides a new portable seat apparatus construction wherein the same can be utilized for making a child more comfortable when seated in a shopping cart, in particular.

The general purpose of the present invention, which will be described subsequently in greater detail, is to provide a new portable seat apparatus which has many of the advantages of the seat apparatus for carts and the like mentioned heretofore and many novel features that result in a new portable seat apparatus which is not anticipated, rendered obvious, suggested, or even implied by any of the prior art seat apparatus for carts and the like, either alone or in any combination thereof.

To attain this, the present invention generally comprises a seat support assembly including a seat support member having a seat support portion and a back rest support portion and being adapted to fasten to a cart and a car seat; and also includes a cushioned seat member having a seat portion and a back rest portion and being attached to and supported upon said the support member; and further includes a fastening member for fastening the cushioned seat member to the seat support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable seat apparatus which has many of the advantages of the seat apparatus for carts and the like mentioned heretofore and many novel features that result in a new portable seat apparatus which is not anticipated, rendered obvious, suggested, or even implied by any of the prior art seat apparatus for carts and the like, either alone or in any combination thereof.

It is another object of the present invention to provide a new portable seat apparatus which may be easily and efficiently manufactured and marketed.

It is a further object of the present invention to provide a new portable seat apparatus which is of a durable and reliable construction.

An even further object of the present invention is to provide a new portable seat apparatus which is susceptible of a low cost of manufacture with regard to both materials and labor, and which accordingly is then susceptible of low prices of sale to the consuming public, thereby making such portable seat apparatus economically available to the buying public.

Still yet another object of the present invention is to provide a new portable seat apparatus which provides in the apparatuses and methods of the prior art some of the advantages thereof, while simultaneously overcoming some of the disadvantages normally associated therewith.

Still another object of the present invention is to provide a new portable seat apparatus for making a child more comfortable when seated in a shopping cart, in particular.

Yet another object of the present invention is to provide a new portable seat apparatus which includes a seat support assembly including a seat support member having a seat support portion and a back rest support portion and being adapted to fasten to a cart and a car seat; and also includes a cushioned seat member having a seat portion and a back rest portion and being attached to and supported upon said the support member; and further includes a fastening member for fastening the cushioned seat member to the seat support member.

Still yet another object of the present invention is to provide a new portable seat apparatus that prevents the child from fussing and squirming while riding in the shopping cart.

Even still another object of the present invention is to provide a new portable seat apparatus that can be easily and quickly attached to a basket of a shopping cart.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 7 thereof, a new portable seat apparatus embodying the principles and concepts of the present invention and generally designated by the reference numeral 10 will be described.

As best illustrated in FIGS. 1 through 7, the portable seat apparatus 10 generally comprises a seat support assembly including a seat support member 11 having a seat support portion 12 and a back rest support portion 13 and being adapted to fasten to a cart 29 and a car seat. The seat support assembly further includes elongate bracket members 14 being securely and conventionally attached along side edges of the seat support portion 12 and the back rest support portion 13. Each of the elongate bracket members 14 includes a first longitudinal portion 15 being securely and conventionally attached to the seat support member 11, and also includes a second longitudinal portion 16 being angled relative to the first longitudinal portion 15 and being spaced from the seat support member 11. Each of the elongate bracket members 14 being attached along the side edges of the back rest support portion 13 has a hole 17 being disposed through the first longitudinal portion 15 near a top end thereof and near a top edge of the seat support member 11.

Figure 3:
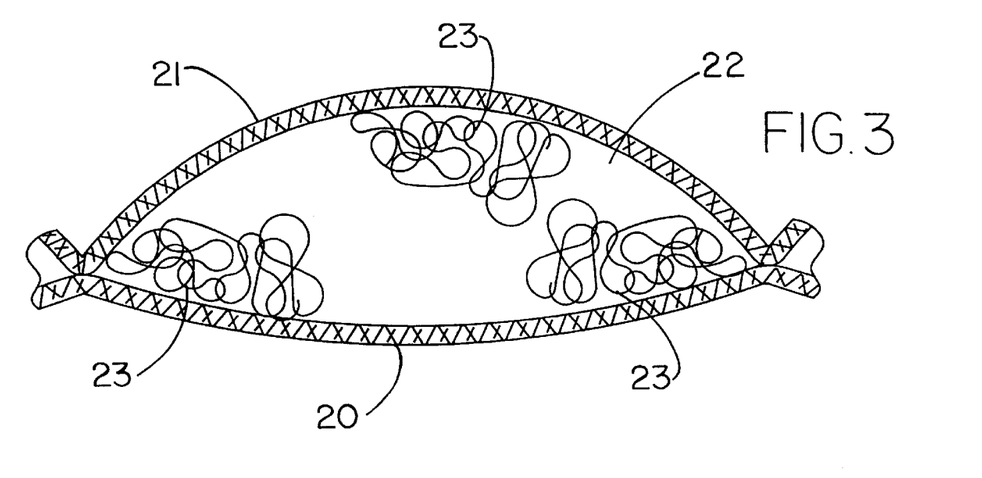
FIG. 3 is a cross-sectional view of the seat cushion of the preset invention.
Figure 4:
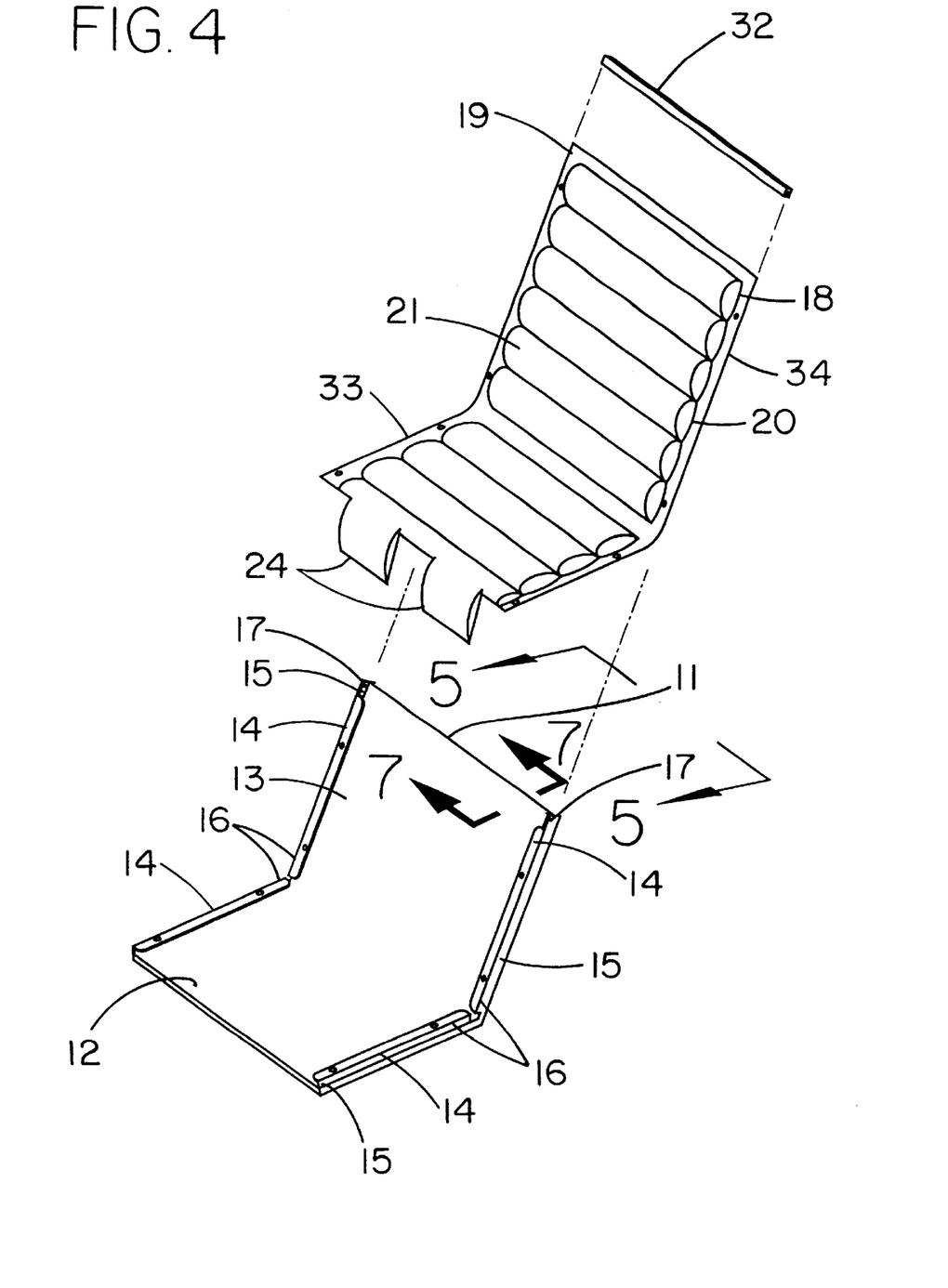
FIG. 4 is an exploded perspective view of the present invention.

A cushioned seat member 18 has a seat portion 33 and a back rest portion 34 and is conventionally attached to and supported upon the seat support member 11. The cushioned seat member 18 includes a flexible sheet-like backing member 19 having the seat portion 33 and the back rest portion 34, and also includes padded sections being securely attached to the sheet-like backing member 19. The padded sections include a lower layer of material 20 being securely and conventionally attached to the sheet-like backing member 19 and also include an upper layer of material 21 being securely and conventionally attached at spaced intervals along thereof to the lower layer of material 20 thus forming cavities 22 between the lower and upper layers of material 20,21 and further including padding members 23 being disposed in the cavities 22. The sheet-like backing member 19 has side edges which are removably received between the second longitudinal portions 16 of the elongate bracket members 14 and the seat support member 11. The upper and lower layers of material 20,21 also have flap portions 24 extending outwardly from bottom ends thereof and being securely and conventionally attached together with padding members 23 being disposed therebetween with the flap portions 24 being foldable upon and attachable to the seat support member 11.

A fastening member 32 for fastening the cushioned seat member 18 to the seat support member 11 is an elongate member 32 being received in the holes 17 of the first longitudinal portions 15 of the elongate bracket members 14.

Figure 2:
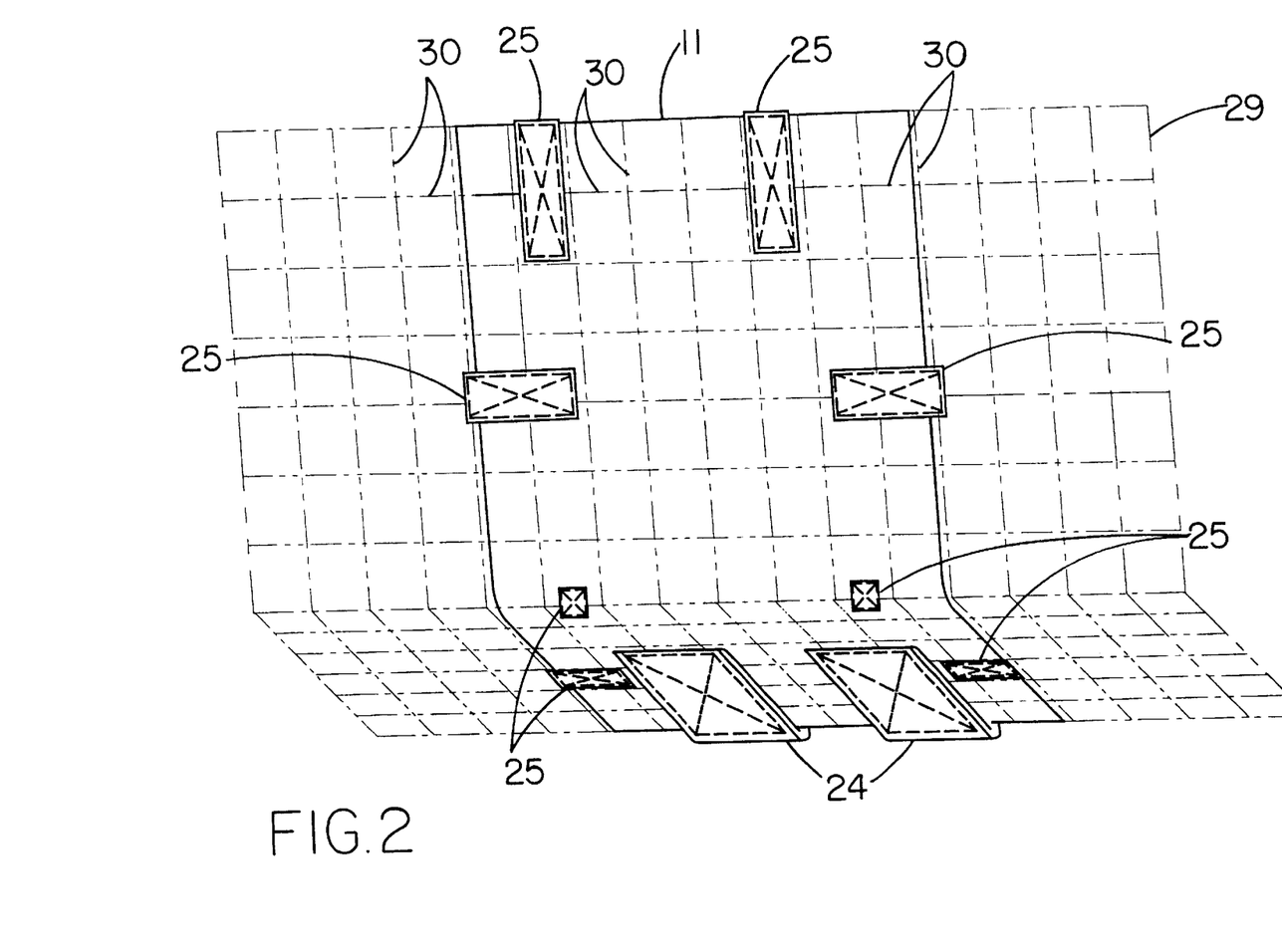
FIG. 2 is a rear perspective view of the present invention attached to a cart.

As a first embodiment, the seat support assembly also includes straps of hook and loop fasteners 25 being securely and conventionally attached along a perimeter of the seat support member 11 and also being securely attached to back and bottom sides thereof for fastening about bars 30 of the shopping cart 29 to secure the seat support member 11 thereto.

Figure 5:
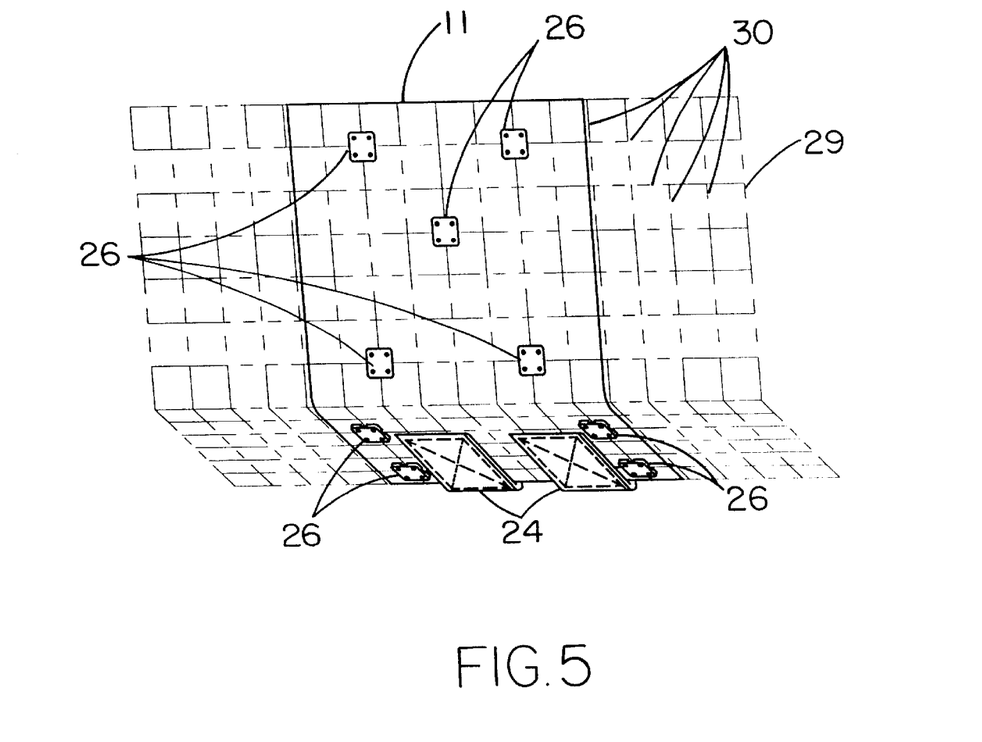
FIG. 5 is a rear perspective view of a second embodiment of the present invention.
Figure 6:
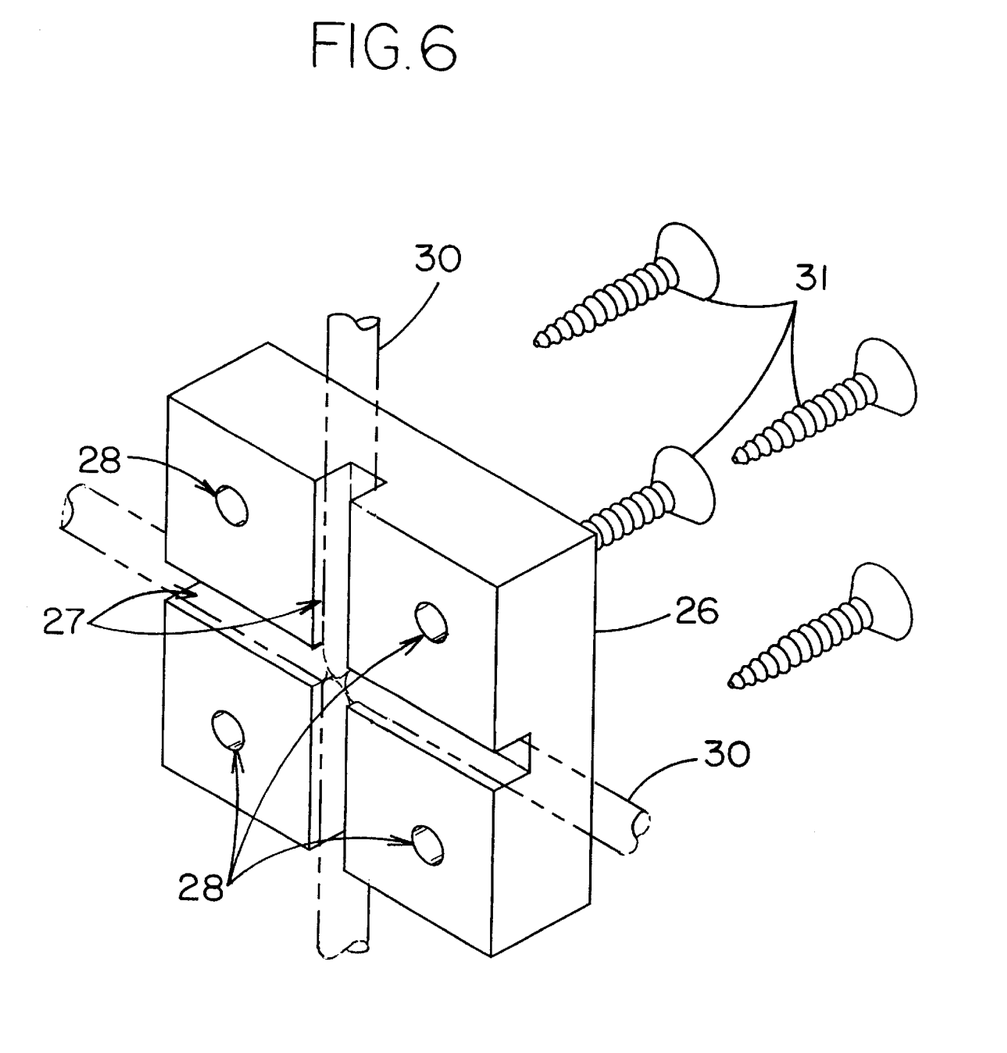
FIG. 6 is a detailed perspective view of a mounting bracket of the present invention.
Figure 7:
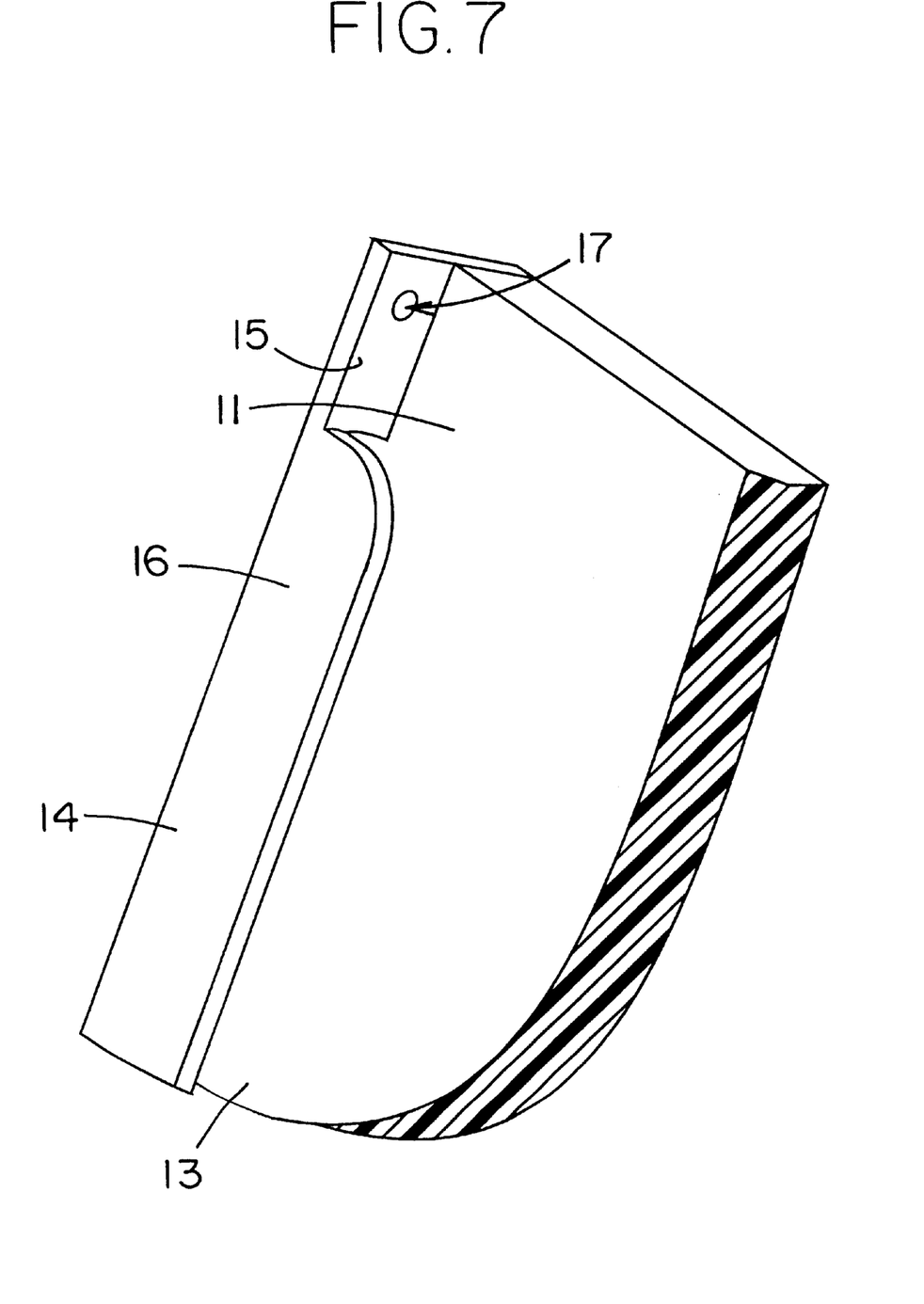
FIG. 7 is a partial perspective view of the seat support member of the present invention.

As a second embodiment, the seat support assembly also includes mounting brackets 26 being securely attached to back and bottom sides of the seat support member 11 and being adapted to receive bars 30 of the shopping cart 29 between the mounting brackets 26 and the seat support member 11. Each of the mounting brackets 26 is generally a block-like member having grooves 27 being disposed in a side thereof and being adapted to receive the bars 30 of the shopping cart 29 therein, and also has a plurality of holes 28 extending therethrough and being adapted to receive fasteners 31 for fastening the block-like member 26 to the seat support member 11.

Figure 1:
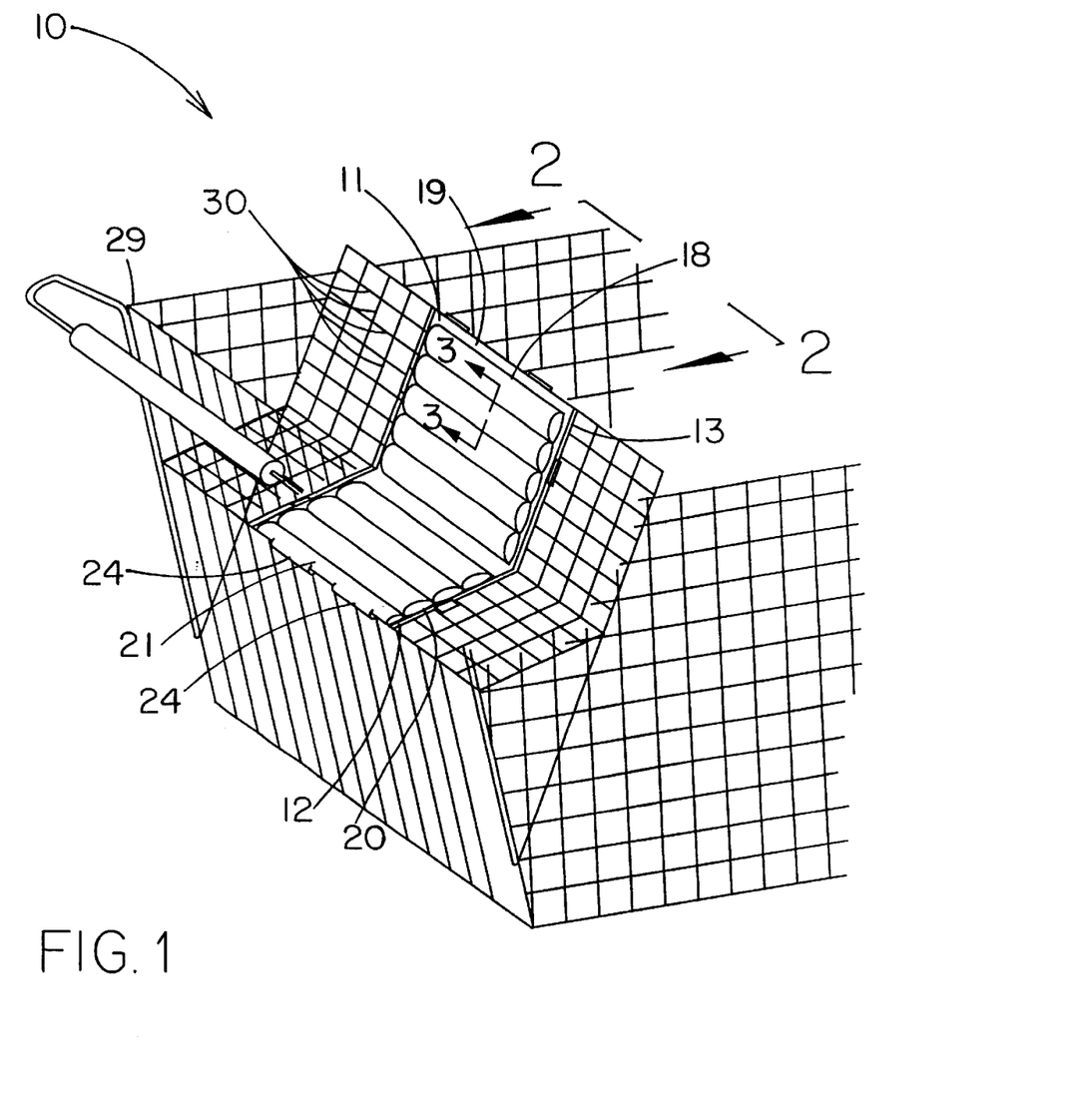
FIG. 1 is a perspective view of a new portable seat apparatus according to the present invention and shown in use.

In use, the user secures the portable seat apparatus 10 upon the basket of the shopping cart using the straps of hook and loop fasteners 25 and sits the child upon the cushioned seat member 18 so that the child will be able to ride upon the shopping cart 29 much more comfortably than if the child was seat directly upon the hard plastic member hingedly attached to the bars 30 of the basket.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable seat apparatus comprising:
    a seat support assembly including a seat support member having a seat support portion and a back rest support portion and being adapted to fasten to a cart and a car seat;
    a cushioned seat member having a seat portion and a back rest portion and being attached to and supported upon said seat support member; and
    a fastening member for fastening said cushioned seat member to said seat support member;
    wherein said seat support assembly further includes elongate bracket members attached along side edges of said seat support portion and said back rest support portion.

2. A portable seat apparatus as described in claim 1, wherein each of said elongate bracket members includes a first longitudinal portion being attached to said seat support member, and also includes a second longitudinal portion being angled relative to said first longitudinal portion and being spaced from said seat support member, each of said elongate bracket members being attached along said side edges of said back rest support portion having a hole being disposed through said first longitudinal portion near a top end thereof and near a top edge of said seat support member.

3. A portable seat apparatus as described in claim 2, wherein said fastening member is an elongate member being received in said holes of said first longitudinal portions of said elongate bracket members.

4. A portable seat apparatus as described in claim 3, wherein said upper and lower layers of material also have flap portions extending outwardly from bottom ends thereof and being attached together with padding members being disposed therebetween, said flap portions being foldable upon and attachable to said seat support member.

5. A portable seat apparatus as described in claim 1, wherein said cushioned seat member includes a flexible sheet backing member having said seat portion and said back rest portion, and also includes padded sections being attached to said sheet backing member, said padded sections including a lower layer of material being attached to said sheet backing member and also including an upper layer of material being attached at spaced intervals along thereof to said lower layer of material thus forming cavities between said lower and upper layers of material and further including padding members being disposed in said cavities, said sheet backing member having side edges which are removably received between said second longitudinal portions of said elongate bracket members and said seat support member.

6. A portable seat apparatus as described in claim 1, wherein said seat support assembly also includes straps of hook and loop fasteners being attached along a perimeter of said seat support member and also being attached to back and bottom sides thereof for fastening about bars of the shopping cart to secure said seat support member thereto.

7. A portable seat apparatus as described in claim 1, wherein said seat support assembly also includes mounting brackets being attached to back and bottom sides of said seat support member and being adapted to receive bars of the shopping cart between said mounting brackets and said seat support member.

8. A portable seat apparatus as described in claim 7, wherein each of said mounting brackets is generally a block member having grooves being disposed in a side thereof and being adapted to receive the bars of the shopping cart therein, and also having a plurality of holes extending therethrough and being adapted to receive fasteners for fastening said block member to said seat support member.

9. A portable seat apparatus comprising:
    a seat support assembly including a seat support member having a seat support portion and a back rest support portion and being adapted to fasten to a cart and a car seat, said seat support assembly further including elongate bracket members being securely attached along side edges of said seat support portion and said back rest support portion, each of said elongate bracket members including a first longitudinal portion being securely attached to said seat support member, and also including a second longitudinal portion being angled relative to said first longitudinal portion and being spaced from said seat support member, each of said elongate bracket members being attached along said side edges of said back rest support portion having a hole being disposed through said first longitudinal portion near a top end thereof and near a top edge of said seat support member;
    a cushioned seat member having a seat portion and a back rest portion and being attached to and supported upon said seat support member, said cushioned seat member including a flexible sheet backing member having said seat portion and said back rest portion, and also including padded sections being securely attached to said sheet backing member, said padded sections including a lower layer of material being securely attached to said sheet backing member and also including an upper layer of material being securely attached at spaced intervals along thereof to said lower layer of material thus forming cavities between said lower and upper layers of material and further including padding members being disposed in said cavities, said sheet backing member having side edges which are removably received between said second longitudinal portions of said elongate bracket members and said seat support member, said upper and lower layers of material also having flap portions extending outwardly from bottom ends thereof and being securely attached together with padding members being disposed therebetween, said flap portions being foldable upon and attachable to said seat support member; and
    a fastening member for fastening said cushioned seat member to said seat support member, said fastening member being an elongate member being received in said holes of said first longitudinal portions of said elongate bracket members.

10. A portable seat apparatus as described in claim 9, wherein said seat support assembly also includes straps of hook and loop fasteners being securely attached along a perimeter of said seat support member and also being securely attached to back and bottom sides thereof for fastening about bars of the shopping cart to secure said seat support member thereto.

11. A portable seat apparatus as described in claim 9, wherein said seat support assembly also includes mounting brackets being securely attached to back and bottom sides of said seat support member and being adapted to receive bars of the shopping cart between said mounting brackets and said seat support member, each of said mounting brackets being generally a block member having grooves being disposed in a side thereof and being adapted to receive the bars of the shopping cart therein, and also having a plurality of holes extending therethrough and being adapted to receive fasteners for fastening said block member to said seat support member.

* * * * *